(12) United States Patent
Himes et al.

(10) Patent No.: US 9,327,443 B2
(45) Date of Patent: May 3, 2016

(54) METHOD FOR PURGING POLYETHYLENE TEREPHTHALATE FROM AN EXTRUSION BLOW MOLDING APPARATUS

(71) Applicant: Graham Packaging Company, L.P., York, PA (US)

(72) Inventors: Kevin D. Himes, Mount Wolf, PA (US); Larry M. Taylor, Landisville, PA (US)

(73) Assignee: Graham Packaging Company, L.P., York, PA (US)

(*) Notice: Subject to any disclaimer, the term of this patent is extended or adjusted under 35 U.S.C. 154(b) by 533 days.

(21) Appl. No.: 13/651,649

(22) Filed: Oct. 15, 2012

(65) Prior Publication Data

US 2013/0037060 A1 Feb. 14, 2013

Related U.S. Application Data

(62) Division of application No. 12/894,273, filed on Sep. 30, 2010, now Pat. No. 8,388,333.

(51) Int. Cl.
| | |
|---|---|
| *B29C 49/42* | (2006.01) |
| *B29C 47/08* | (2006.01) |
| *B29C 47/92* | (2006.01) |
| *B29C 49/04* | (2006.01) |
| *B29C 47/00* | (2006.01) |

(52) U.S. Cl.
CPC ............. *B29C 49/42* (2013.01); *B29C 47/0883* (2013.01); *B29C 47/0894* (2013.01); *B29C 47/92* (2013.01); *B29C 47/0023* (2013.01); *B29C 49/04* (2013.01)

(58) Field of Classification Search
CPC ............ B29C 49/4284; B29C 47/0894; B29C 47/0883; B29B 7/801; B29B 7/842
See application file for complete search history.

(56) References Cited

U.S. PATENT DOCUMENTS

| 2,750,625 A | 6/1956 | Colombo |
| 3,421,886 A | 1/1969 | Schelleng |

(Continued)

FOREIGN PATENT DOCUMENTS

| CN | 200977723 | 11/2007 |
| DE | 10 2005 029 916 | 3/2007 |

(Continued)

OTHER PUBLICATIONS

International Search Report for International Application No. PCT/US2011/054667 issued by the European Patent Office with a mailing date of Jan. 27, 2012.

(Continued)

*Primary Examiner* — Robert B Davis
(74) *Attorney, Agent, or Firm* — Stradley Ronon Stevens & Young, LLP

(57) ABSTRACT

A method for purging a molten thermoplastic material from a blow molding system. The method includes the steps of feeding the molten thermoplastic material into a flow head operably connected to a purge diverter valve including a channel and a closing member; opening the closing member, wherein the opening step diverts the thermoplastic material from the flow head into the channel and causes the thermoplastic material to flow through the channel; and collecting the thermoplastic material flowing through the channel. The method can be used to purge molten thermoplastic materials such as polyethylene terephthalate especially from an upward extruding blow mold system.

19 Claims, 4 Drawing Sheets

(56) References Cited

U.S. PATENT DOCUMENTS

| | | | |
|---|---|---|---|
| 3,484,897 | A | 12/1969 | Kovacs |
| 3,589,163 | A | 6/1971 | Byrne et al. |
| 3,932,084 | A | 1/1976 | Reilly |
| 4,046,498 | A | 9/1977 | Appel et al. |
| 4,507,072 | A | 3/1985 | Gaul, Jr. |
| 4,648,831 | A | 3/1987 | Johnson |
| 4,755,290 | A | 7/1988 | Neuman et al. |
| 4,801,361 | A | 1/1989 | Bullard et al. |
| 4,859,397 | A | 8/1989 | Peters |
| 4,867,197 | A | 9/1989 | Ritter et al. |
| 4,943,228 | A | 7/1990 | Reymann et al. |
| 4,946,366 | A | 8/1990 | Dundas et al. |
| 4,984,977 | A | 1/1991 | Grimminger et al. |
| 5,078,948 | A | 1/1992 | Troutman et al. |
| 5,698,241 | A | 12/1997 | Kitzmiller |
| 6,135,145 | A | 10/2000 | Bolling |
| 6,345,973 | B1 | 2/2002 | Nielsen |
| 6,632,493 | B1 | 10/2003 | Hildebrand et al. |
| 6,787,073 | B1 | 9/2004 | Tadler et al. |
| 7,766,645 | B2 | 8/2010 | Legallais |
| 2008/0069915 | A1 | 3/2008 | Busse et al. |
| 2009/0085243 | A1 | 4/2009 | Taylor et al. |

FOREIGN PATENT DOCUMENTS

| | | |
|---|---|---|
| DE | 102007044617 | 4/2009 |
| EP | 1 273 417 | 8/2003 |
| EP | 1 598 165 | 11/2005 |
| EP | 2008784 | 12/2008 |
| EP | 2030757 | 3/2009 |
| JP | 2005-35060 | 2/2005 |
| JP | 200887856 | 4/2008 |
| WO | 92/03276 | 3/1992 |
| WO | 01/32388 | 5/2001 |
| WO | 2005/002742 | 1/2005 |
| WO | 2009/059091 | 5/2009 |

OTHER PUBLICATIONS

International Search Report for International Application No. PCT/US2011/054678 issued by the European Patent Office with a mailing date of Feb. 17, 2012.

International Search Report for International Application No. PCT/US2011/049102 issued by the European Patent Office with a mailing date of Oct. 9, 2012.

METHOD FOR PURGING POLYETHYLENE TEREPHTHALATE FROM AN EXTRUSION BLOW MOLDING APPARATUS

RELATED APPLICATION

This application is a divisional of copending U.S. application Ser. No. 12/894,273 titled "Systems for Purging Polyethylene Terephthalate from an Extrusion Blow Molding Apparatus," filed on behalf of inventors Kevin D. Himes and Larry M. Taylor, assigned to the assignee of the present application, and incorporated in this application by reference.

FIELD OF THE INVENTION

The invention relates generally to the field of blow molding. More particularly, the invention relates to a method for purging molten thermoplastic materials from the flow head of a blow molding apparatus.

BACKGROUND OF THE INVENTION

Various publications, including patents, published applications, technical articles, and scholarly articles, are cited throughout the specification. Each of these cited publications is incorporated by reference in this document, in its entirety and for all purposes.

Polymer resins, such as polyethylene terephthalate (PET), are widely used in the packaging industry. PET is a linear, thermoplastic polyester resin. The advantages of PET include toughness, clarity, good barrier properties, light weight, design flexibility, chemical resistance, and good shelf-life performance. Furthermore, PET is environmentally friendly because it can often be recycled. These characteristics of PET make it a popular material in the manufacturing of containers, for example, beverage bottles.

There are a variety of production methodologies to produce PET containers. For example, injection stretch blow molding is commonly used to make PET bottles. Of the various methodologies, onepiece PET containers having an integrated handle are commonly formed using extrusion blow molding (EBM). The EBM process includes extruding a polymer resin in a softened state through an annular die to form a molten hollow tube or parison. The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

Polyesters are typically classified by inherent viscosity (I.V.) as a measure of molecular weight. To form beverage bottles, "bottle-grade" PET having an I.V. of about 0.72-0.84 dl/g is typically used. Bottlegrade PET has linear polymer chains and has a melt viscosity that is low enough to enable a fast injection stretch blow molding step with minimal resistance to flow. Bottle-grade PET generally cannot be used in the production of larger handle-ware containers using EBM, however, because of low melt strength. Melt strength is quantified by measuring melt viscosity at very low shear rates (approaching zero shear rate). Low melt strength hinders the ability to form a suitable parison. If a parison in the molten state has insufficient melt strength, the parison may form an hour-glass shape or may completely collapse as the parison is drawn down by its own weight, thereby resulting in the inability to produce a container. As melt strength increases, material distribution in the walls of the resultant container improves, and the process becomes more controllable and repeatable.

To make PET suitable for EBM, PET manufacturers have developed special grades of PET sometimes called extrusion PET or "EPET." Typically, EPET is high molecular weight PET having an I.V. of 1.0 dl/g or greater as measured by solution viscosity. For PET resins, I.V. is used as a measure of molecular weight. The average molecular weight of a resin reflects the average length of polymer chains present in the resin. In general, melt strength increases with chain length and, thereby, also increases with molecular weight. Higher I.V. polymers generally require higher processing temperatures, however, which lead to certain processing challenges.

Given the higher temperatures at which EPET is melted and maintained during article manufacture, the molten EPET will degrade if production is halted for extended periods of time, which in turn will affect the quality of the containers produced from the degraded EPET. Degraded EPET is hotter, less viscous, tackier, and less predictable than other resins, particularly when used in upward extruding blow molding systems. Accordingly, degraded molten EPET should be removed from the molding apparatus and replaced with fresh molten EPET before restarting the molding run. The molten EPET to be removed from the blow molding apparatus also creates a hazard for workers tasked with removing the EPET material, and could damage mechanical or electrical components of molding systems if it comes in contact with them.

Safer and more efficient mechanisms for removing molten thermoplastic materials from upward extruding molding systems are needed, both to reduce the time needed to "reset" the apparatus by removing the old, degraded material and restarting the run, to protect workers who remove the old material from the molding system, and to protect the system components.

Typical mechanisms for redirecting flowing materials include the use of conventional valves, for example, an improved high-pressure ram valve as described in U.S. Pat. No. 4,867,197 issued to Ritter et al. Industrial valves are commercially available from suppliers such as SchuF (USA), Inc. of Mt. Pleasant, S.C. (www.schufusa.com). It is believed that conventional valves have not been configured for integration into an upward extruding blow molding flow head to direct molten thermoplastic materials from the flow head. Thus, there remains a need for an improved diverter valve for redirecting molten thermoplastic materials out of a blow molding flow head, with the valve configured for unified integration with the flow head.

SUMMARY OF THE INVENTION

To meet these and other needs, and in view of its purposes, the present invention provides a system for purging molten thermoplastic material from a blow molding apparatus, and preferably an upward extruding blow molding apparatus. The system comprises a blow mold apparatus, for example, an upward extruding blow molding apparatus, and a purge diverter valve operably connected to the blow mold apparatus. The purge diverter valve has a channel, a closing member disposed within the channel, and a spacer including a conduit in communication with the channel. The system also comprises a melt pipe in communication with the channel. When closed, the closing member plugs the valve channel such that substantially no thermoplastic material flowing through the conduit enters the valve channel. When opened, the closing member allows thermoplastic material flowing through the conduit to enter the valve channel. The melt pipe directs thermoplastic material out of the purge diverter valve.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Figure 1:
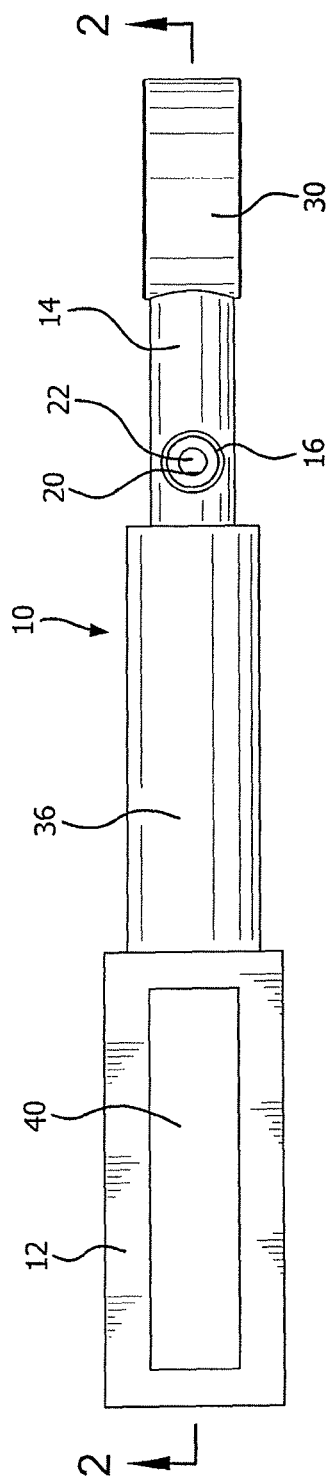
FIG. 1 is a side view of a purge diverter valve according to an example embodiment of the present invention.

Various terms relating to aspects of the present invention are used throughout the specification and claims. Such terms are to be given their ordinary meaning in the art, unless otherwise indicated. Other specifically defined terms are to be construed in a manner consistent with the definition provided in this document. As used in this document, the singular forms "a," "an," and "the" include plural referents unless expressly stated otherwise. The word "distal" refers to a location on a device or a component that is farthest from the operator when the operator uses the device or component to manufacture products. The word "proximal" refers to a location on a device or a component that is closest to the operator when the operator uses the device or component to manufacture products.

The invention features systems for purging a molten thermoplastic material from a blow molding apparatus. The systems may be used with any blow molding apparatus, preferably are used with an upward extruding blow molding apparatus, and may be used to purge any thermoplastic material from the blow molding apparatus. Thermoplastic materials include but are not limited to high density polyethylene (HDPE), low density polyethylene (LDPE), polypropylene (PP), polyvinyl chloride (PVC), polyphenyl ether (PPE), polyethylene terephthalate (PET), and polystyrene (PS). A preferred thermoplastic material is EPET. Referring now to the drawings, in which like reference numbers refer to like elements throughout the various figures that comprise the drawings, the systems are illustrated in FIGS. 1-5 and are described in more detail below with respect to these figures.

Figure 2:
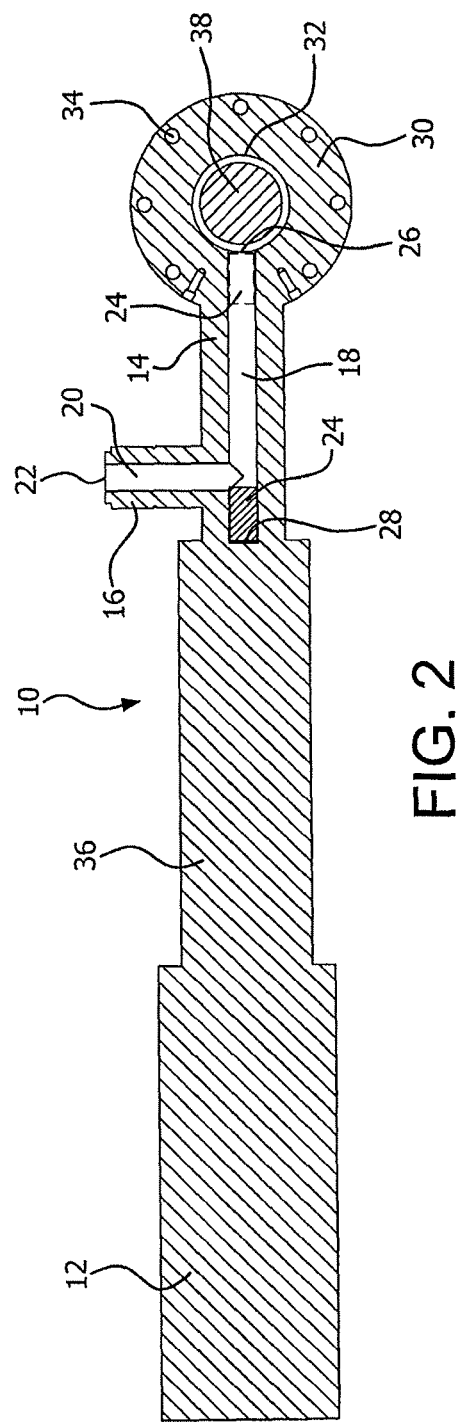
FIG. 2 is a cross-sectional view of the purge diverter valve taken along the line 2-2 of FIG. 1.

In one aspect, the systems comprise a purge diverter valve 10 illustrated in the side view of FIG. 1 and the cross-sectional view of FIG. 2. The purge diverter valve 10 may be fabricated from any suitable material, preferably a metal or ceramic capable of withstanding the temperatures of a molten thermoplastic material such as EPET. The purge diverter valve 10 includes an hydraulic cylinder 12 which contains components for actuating a closing member 24, as described in more detail below. The hydraulic cylinder 12 is operably connected to a valve body 14 through an intermediate section 36. The valve body 14 preferably has at least one extending branch 16. The branch 16 may be substantially perpendicular to the valve body 14, as shown in the figures, or may extend from the valve body 14 at any angle.

The valve body 14 includes a valve channel 18 within which the closing member 24 can be disposed. The valve channel 18 comprises a valve inlet 26 and a valve outlet 22, and preferably is in communication with a branch channel 20 that intersects the valve channel 18. The branch channel 20 ends at the valve outlet 22. The valve channel 18 and the branch channel 20 may have any suitable cross-sectional diameter, and any suitable cross-sectional shape. Preferably, the valve channel 18 and the branch channel 20 have substantially the same diameter, and have a circular cross-section.

The valve body 14 has a spacer 30, which includes a conduit 32, through which a molten thermoplastic material or parison passes on its way to a mold. The conduit 32 includes the valve inlet 26 of the valve channel 18, thereby allowing the valve inlet 26 and the valve channel 18 to be in communication with the conduit 32.

The spacer 30 has one or more bores 34 through which fasteners such as bolts may used to secure the diverter valve 10 in place within the system. The spacer 30 may have any suitable shape, and preferably has a round shape. In highly preferred aspects, the spacer 30 has the size and shape of a standard flow head spacer such that the spacer 30 can be substituted for a standard flow head spacer in a blow molding apparatus.

The closing member 24 can have any structure, such that when the closing member 24 is closed, it is capable of substantially preventing the flow of molten thermoplastic material into the valve channel 18. For example, the closing member 24 may be a plunger, gate, piston, rod, ram, lid, door, cap, ball, seal, or other suitable structure capable of closing the valve channel 18 or otherwise capable of controlling the flow of thermoplastic material into the purge diverter valve 10.

In some preferred aspects, the closing member 24 is a plunger slidably disposed in the valve channel 18, and has a cross-sectional diameter and cross-sectional shape to closely fit within the valve channel 18. The closing member 24 controls the flow of thermoplastic material into and through the valve channel 18 by controlled movement between an extended (closed) position and a retracted (open) position. In some aspects, the closing member 24 is substantially perpendicular to and intersects the valve channel 18.

When closed, as shown in the dashed position to the right in FIG. 2, the closing member 24 is positioned substantially flush with the side wall of the spacer conduit 32, and plugs the valve inlet 26 of the valve channel 18 such that substantially no thermoplastic material enters the valve channel 18. When the closing member 24 is closed, a head tooling pin 38 in the flow head 200 is open to allow thermoplastic material to flow through the spacer conduit 32. This configuration represents the production mode for the system. In some aspects, when the closing member 24 is disposed in the valve channel 18 and is fully extended, the distal end of the closing member 24 (for example, a plunger) is positioned at the opening of the valve inlet 26, and the distal end is substantially flush with the side wall of the conduit 32 such that the distal end of the closing member 24 blocks the valve inlet 26. In some alternative aspects whereby the closing member is positioned perpendicularly to the valve channel 18 such that it intersects the valve channel 18, when the closing member 24 is fully extended, a side wall of the closing member 24 is positioned at the opening of the valve inlet 26, and is substantially flush with the side wall of the conduit 32 such that the side wall of the closing member 24 blocks the valve inlet 26. Regardless, the closing member 24 does not disrupt the flow of thermoplastic material through the conduit 32 and into a mold (not shown).

When opened, as shown adjacent the socket 28 to the left in FIG. 2, the closing member 24 no longer plugs the valve inlet 26 such that thermoplastic material is diverted from the conduit 32 through the valve inlet 26, into the valve channel 18, and into the branch channel 20. When the closing member 24 is open, the head tooling pin 38 is closed to allow thermoplastic material to flow only through the valve channel 18, and not through the conduit 32. This configuration represents the purge mode for the system. In some aspects, the retracted closing member 24 (for example, a plunger) may be positioned substantially flush with a proximal side wall of the branch channel 20. When opened, the closing member 24 may be positioned within the socket 28, which extends outward or backward from the valve channel 18. The socket 28 is thus preferably in communication with the valve channel 18, and may have substantially the same diameter and cross-sectional shape as the valve channel 18.

The purge diverter valve 10 may comprise actuators 40 to extend and retract the closing member 24. Any suitable actuators 40 may be used to move the closing member 24, including a hydraulic actuator, as would be known to an artisan. Such actuators 42 may be located within the hydraulic cylinder 12.

The systems may comprise actuators 42 to open and close the head tooling pin 38. Any suitable actuators 42 may be used to move the head tooling pin 38, including a hydraulic actuator, as would be known to an artisan. A servo actuator is one example of a suitable actuator 40. Such actuators 40 may be located within the flow head 200 (see FIG. 4), or alternatively may be located in the spacer 30 of the purge diverter valve 10.

Figure 5:
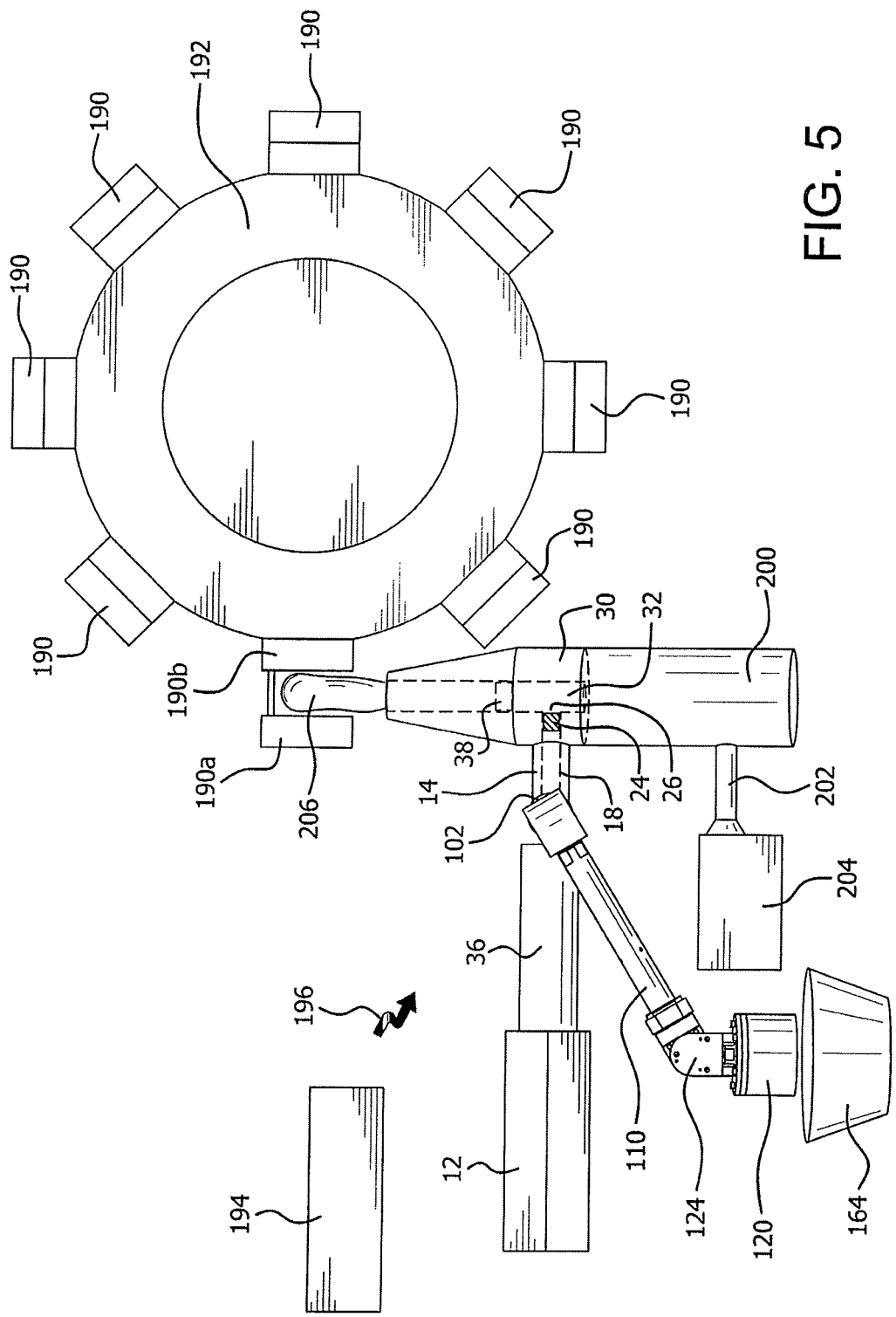
FIG. 5 is a schematic illustration of a blow mold apparatus indicating the location of a purge diverter valve according to an example embodiment of the present invention.

Actuation of the closing member 24 and/or the head tooling pin 38 may be controlled by a controller 194 (see FIG. 5). The controller 194 may be a processor, a programmable logic controller, or other electronic controller. Communication between the controller 194 and the closing member 24, and the head tooling pin 38 as well as the various other components of the system, may be through wires, may be wireless, or a combination of wired and wireless systems. The controller coordinates the opening and closing of the closing member 24 and the head tooling pin 38 in order to control flow of a thermoplastic material through the flow head or out from the flow head and into the diverter valve.

Figure 3:
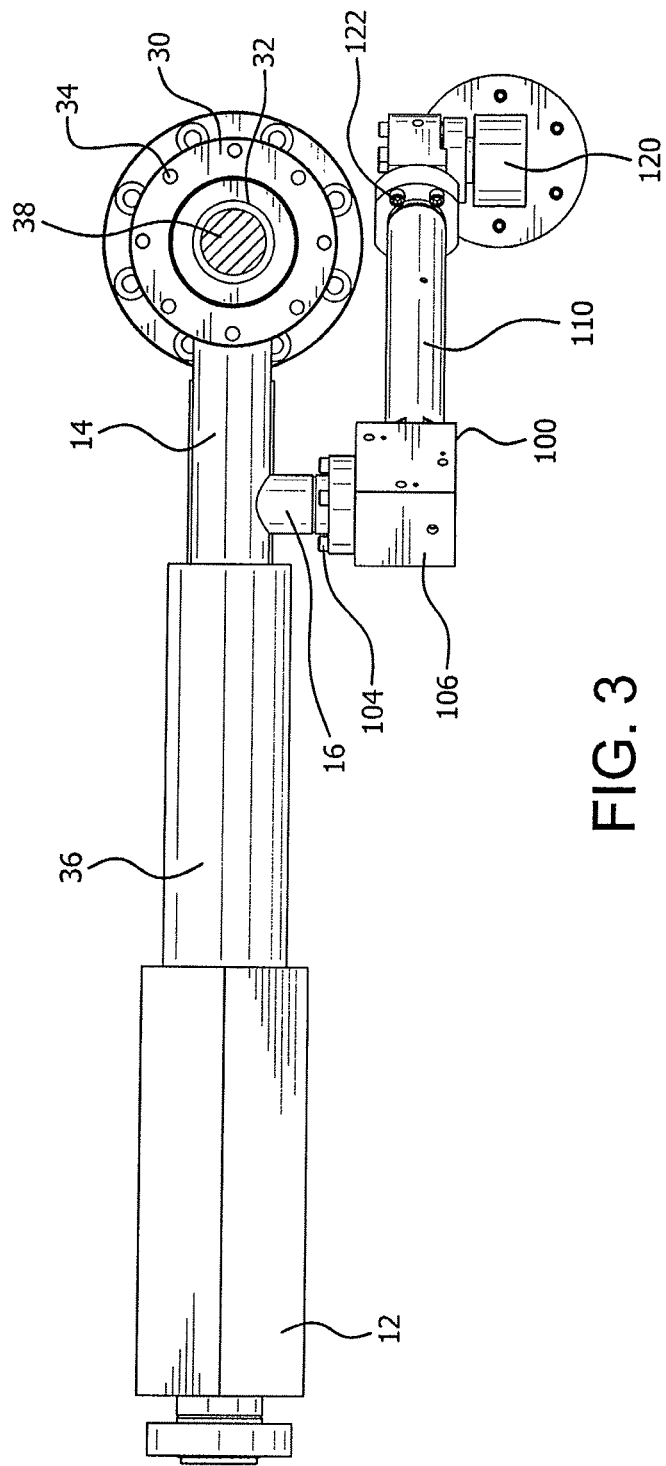
FIG. 3 is a top view of a purge diverter valve, connected with a melt pipe assembly for diverting parison material out from the valve, according to an example embodiment of the present invention.
Figure 4:
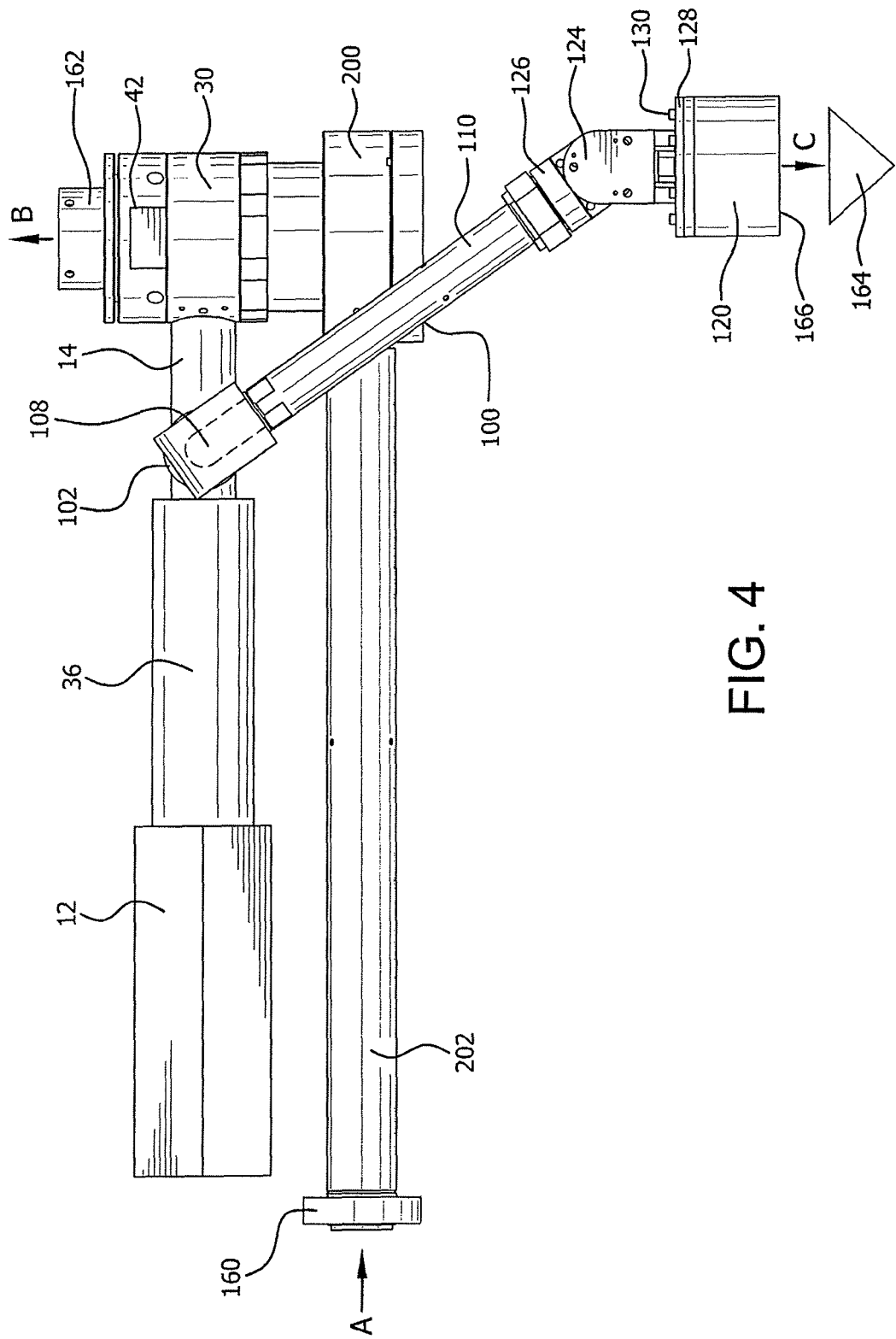
FIG. 4 is a side view of a purge diverter valve positioned relative to an extruder and a flow head according to an example embodiment of the present invention.

The purge diverter valve 10 may be operably connected to additional components to divert the thermoplastic material out of the purge diverter valve 10 for collection, and for re use or discarding. FIGS. 3 and 4 illustrate one embodiment of the purge diverter valve 10 operably connected to a melt pipe assembly 100. FIG. 3 is a top view, and FIG. 4 is a side view, of this embodiment. The thermoplastic material enters the conventional inflow 160 along the direction of arrow "A" and travels through a melt pipe 202 to a flow head 200. The flow head 200 delivers the thermoplastic material to the spacer 30. When the closing member 24 is closed (i.e., the system is in its production mode), the thermoplastic material flows upward and out of the production exit 162 along the direction of arrow "B." It is important to note that, in conventional systems, the thermoplastic material flows downward (opposite the upward flow in an upward extruding system) and conventional systems avoid one of the problems addressed and solved by the invention, particularly as concerns upward extruding systems.

The valve branch 16 is connected to a melt pipe assembly 100 via a mounting plate 102 that is fastened to a junction box 106 with fasteners 104 such as bolts. The junction box 106 has a junction box channel 108 that is in communication with a melt pipe 110. Thus, the branch channel 20 communicates with the junction box channel 108, and diverted thermoplastic material passes through the branch channel 20, through the valve outlet 22, though the junction box channel 108, and into the melt pipe 110.

The junction box channel 108 may have any suitable cross-sectional shape and cross sectional diameter, and preferably has a cross-sectional shape and diameter compatible with the cross-sectional shape and diameter of the melt pipe 110. The melt pipe 110 may be heated or unheated. In some aspects, the melt pipe 110 may be substituted with another type of tube or channel.

In an alternative embodiment, the valve branch 16 may be directly connected to the melt pipe 110, or otherwise connected to the melt pipe 110 without the use of the junction box 106. Thus, the branch channel 20 may be in direct communication with the melt pipe 110, and diverted thermoplastic material may pass through the branch channel 20, through the valve outlet 22, and into the melt pipe 110. The melt pipe 110 may be heated or unheated. In some aspects, the melt pipe 110 may be substituted with another type of tube or channel.

The melt pipe 110 may optionally be connected to and in communication with a splatter guard 120. The splatter guard 120 directs diverted thermoplastic material through a purging exit 166, in the direction of arrow "C," and into a collector 164 while preventing or reducing the splattering of thermoplastic material as it exits the melt pipe 110. The collector 164 may be any container.

In some aspects, the splatter guard 120 includes a junction 122 that connects the splatter guard 120 to the melt pipe 110. The junction 122 has a flange 126 at the point of connection with the melt pipe 110. The junction 122 also has a hinge 124 that allows the splatter guard 120 to be moveable in order to direct the diverted thermoplastic material in a desired direction. The hinge 124 may swivel, turn, or move in any direction in order to allow for a full range of motion of the splatter guard 120. The junction 122 has a mounting plate 128 that facilitates connection with the splatter guard 120. The mounting plate 128 may be connected to the splatter guard 120 with fasteners 130. Alternatively, the splatter guard 120 may be an integral part of the junction 122, without the need for a separate mounting plate 128 and mounting plate fasteners 130. By "integral" is meant a single piece or a single unitary part that is complete by itself without additional pieces, i.e., the part is of one monolithic piece formed as a unit with another part.

The purge diverter valve 10 can be used in any blow molding apparatus. A preferred type of blow molding apparatus is an upward extruding blow molding apparatus. An example of an upward extruding blow molding apparatus is shown schematically in FIG. 5. FIG. 5 shows both the position of the purge diverter valve 10 within the blow molding apparatus and relative to other components of the blow molding apparatus. More specifically, FIG. 5 shows a preferred position of the purge diverter valve 10 relative both to the flow head 200 and to a mold 190, which has mold halves 190a and 190b. The mold 190 typically travels on a wheel 192.

The blow molding apparatus, for example, an upward extruding blow molding apparatus, includes the flow head 200 into which molten thermoplastic material is fed via at least one inflow 160 connected to at least one extruder 204.

Multiple extruders 204 and inflows 160 may be used, for example, for forming a multiple-layered parison (see, for example, U.S. Patent Publication No. 2009/0085243). The extruder 204 may be, for example, a screw extruder as is commonly used in the art. The extruder 204 directs molten thermoplastic material into the melt pipe 202 or other type of tube or channel, and the melt pipe 202 is connected to and in communication with the flow head 200 via a port.

During production mode, the molten thermoplastic material enters the flow head 200 and passes through the conduit 32 of the spacer 30 of the purge diverter valve 10. The closing member 24 is closed such that it plugs the valve inlet 26 of the valve channel 18, and the head tooling pin 38 is open such that the thermoplastic material can freely pass through the conduit 32 and the flow head 200.

In the center void of the flow head 200 a mandrel is present, and the molten thermoplastic material flows against the outside diameter of the mandrel to create the inner diameter of a hollow parison 206. Inside the mandrel is a die stem which can be actuated up and down, for example, by a servo actuator. A die pin is operably connected to the die stem, and this die pin can be changed to accommodate different parison sizes for different container designs. The die pin is part of the head tooling, which includes a head tooling pin 38 to create the inner diameter of the parison 206, and a bushing to create the outer diameter of the parison 206. A parison 206 is thus formed from the molten thermoplastic material in the flow head 200, and the parison 206 continuously flows upward from the flow head 200 and into the mold halves 190*a*, 190*b*, where the molten thermoplastic material is blown into a desired shape.

When production is stopped for a significant period of time (e.g., 30 minutes or more), such that the thermoplastic material must be purged from the blow molding apparatus, the closing member 24 is opened, the head tooling pin 38 is closed, and the thermoplastic material is diverted from the conduit 32, through the valve inlet 26, into the valve channel 18, into the branch channel 20 (if present), out from the valve outlet 22, into the melt pipe 110 or melt pipe assembly 100, out from the melt pipe 110 or melt pipe assembly 100 and past the splatter guard 120, and ultimately into the collector 164. Opening of the closing member 24 may change pressure within the valve channel 18 so as to facilitate the flow of molten thermoplastic material from the conduit 32 into the valve channel 18.

A system may thus comprise a blow molding apparatus including the flow head 200; one or more melt pipes 110, 202; one or more extruders 204; and one or more purge diverter valves 10 as described and exemplified above. The blow molding apparatus preferably is an upward extruding blow molding apparatus. The system may further comprise one or more molds 190. The system may further comprise a controller 194 for transmitting a signal 196 controlling flow of the thermoplastic material through the blow molding apparatus and the purge diverter valves 10. The system may further comprise a thermoplastic material such as EPET. The system may still further comprise a parison 206 comprised of the thermoplastic material.

Methods for purging a molten thermoplastic material from a blow molding system, for example, the systems described or exemplified above, are provided. The methods comprise diverting the molten thermoplastic material fed into a flow head 200 into and ultimately out from a purge diverter valve 10 such as the purge diverter valves 10 described or exemplified above. For example, the methods may comprise feeding the molten thermoplastic material into the flow head 200 of a blow molding apparatus, with the flow head 200 being operably connected to the purge diverter valve 10, opening the purge diverter valve 10 such that the thermoplastic material flows through the purge diverter valve 10, and collecting the thermoplastic material flowing through the purge diverter valve 10. Opening the purge diverter valve 10 may comprise opening the closing member 24 disposed in the purge diverter valve 10.

Molten thermoplastic material is purged from a blow molding system primarily to (1) prevent degradation of the molten thermoplastic material sitting idly within the system at high temperatures, for example, during temporary stoppages of a blow molding production run; and (2) assure the safety of the operator. Unless the material is purged, degraded material will be formed in the system after a significant cessation of operation of the system and, upon resumption of production, the degraded material will be used to form inadequate products. In addition, upon resumption of production, the degraded material may be very tacky, may damage components of the system, may even spray outward or explode from the system and injure personnel.

The methods according to the present invention may also comprise stopping the feed of thermoplastic material into the flow head 200 for a period of time before opening the purge diverter valve 10. The period of time may be less than the time in which the molten thermoplastic material begins to degrade, such that the thermoplastic material may be collected and reused. The period of time may be equal to or greater than the time in which the molten thermoplastic material begins to degrade, such that the thermoplastic material may be collected and discarded. Thus, the period of time may vary with the particular thermoplastic material being used, and may relate to whether the thermoplastic material is superheated. In some aspects, the period of time is about 15 minutes or less. In some aspects, the period of time is about 30 minutes or less.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

We claim:

1. A method for purging a molten thermoplastic material from a blow molding system comprising the steps of:
   feeding a molten thermoplastic material into a flow head operably connected to a purge diverter valve including a channel and a closing member;
   stopping the feeding of the molten thermoplastic material into the flow head for a period of time, resulting in a volume of the molten thermoplastic material remaining in the flow head; and
   purging the flow head of the volume of the molten thermoplastic material after the period of time has elapsed by opening the closing member, wherein opening the closing member diverts the volume of the thermoplastic material from the flow head into the channel and causes the volume of the thermoplastic material to flow through the channel.

2. The method of claim 1, wherein the blow molding system includes:
   (a) a blow mold apparatus including the flow head;
   (b) the purge diverter valve operably connected to the blow mold apparatus, the purge diverter valve having the channel, the closing member, and a spacer including a conduit in communication with the channel; and (c) a melt pipe in communication with the channel,
wherein the closing member, when closed, plugs the valve channel such that substantially no thermoplastic material flowing through the conduit enters the valve channel and, when opened, allows thermoplastic material flowing into the conduit to enter the valve channel, and wherein the melt pipe directs thermoplastic material out of the purge diverter valve.

3. The method of claim 2, further comprising the step of heating the melt pipe.

4. The method of claim 1, wherein the thermoplastic material is selected from the group consisting of high density polyethylene, low density polyethylene, polypropylene, polyvinyl chloride, polyphenyl ether, polyethylene terephthalate, polystyrene, and extrusion polyethylene terephthalate.

5. The method of claim 4, wherein the thermoplastic material is extrusion polyethylene terephthalate.

6. The method of claim 1, wherein the closing member is a plunger slidably disposed in the channel.

7. The method of claim 1, wherein the period of time is less than the time in which the molten thermoplastic material begins to degrade.

8. The method of claim 7, further comprising collecting the thermoplastic material flowing through the channel and reusing the collected thermoplastic material.

9. The method of claim 1, wherein the period of time is greater than or equal to the time in which the molten thermoplastic material begins to degrade.

10. The method of claim 9, further comprising collecting the thermoplastic material flowing through the channel and discarding the collected thermoplastic material.

11. The method of claim 1, wherein the flow head includes a head tooling pin, and further comprising the step of closing the head tooling pin.

12. The method of claim 1 further comprising the step of controlling the operation of the blow molding system using a controller.

13. The method of claim 1 wherein the blow molding system is an upward extruding system.

14. A method for purging a molten thermoplastic material from an upward extruding blow molding system comprising the steps of:
feeding a molten thermoplastic material into a flow head operably connected to a purge diverter valve including a channel and a closing member;
stopping the feeding step for a period of time before opening the closing member;
opening the closing member, wherein the opening step diverts the thermoplastic material from the flow head into the channel and causes the thermoplastic material to flow through the channel;
collecting the thermoplastic material flowing through the channel; and
controlling the operation of the blow molding system using a controller.

15. The method of claim 14 further comprising the step of determining whether the period of time during which the feeding step is stopped is greater than, less than, or equal to the time in which the molten thermoplastic material begins to degrade.

16. The method of claim 15 further comprising the step of discarding the collected thermoplastic material if the period is greater than or equal to the time in which the molten thermoplastic material begins to degrade and reusing the collected thermoplastic material if the period is less than the time in which the molten thermoplastic material begins to degrade.

17. The method of claim 14, wherein the thermoplastic material is selected from the group consisting of high density polyethylene, low density polyethylene, polypropylene, polyvinyl chloride, polyphenyl ether, polyethylene terephthalate, polystyrene, and extrusion polyethylene terephthalate.

18. A method for purging a molten thermoplastic material from an upward extruding blow molding system comprising the steps of:
providing an upward extruding blow molding system having (a) a blow mold apparatus including a flow head, (b) a purge diverter valve operably connected to the blow mold apparatus, the purge diverter valve including a channel, a closing member, and a spacer with a conduit in communication with the channel, and (c) a melt pipe in communication with the channel, wherein the closing member, when closed, plugs the valve channel such that substantially no thermoplastic material flowing through the conduit enters the valve channel and, when opened, allows thermoplastic material flowing into the conduit to enter the valve channel, and wherein the melt pipe directs thermoplastic material out of the purge diverter valve;
feeding a molten thermoplastic material into the flow head;
stopping the feeding step for a period of time before opening the closing member;
determining whether the period of time during which the feeding step is stopped is greater than, less than, or equal to the time in which the molten thermoplastic material begins to degrade;
opening the closing member, wherein the opening step diverts the thermoplastic material from the flow head into the channel and causes the thermoplastic material to flow through the channel;
collecting the thermoplastic material flowing through the channel; and
controlling the operation of the blow molding system using a controller.

19. The method of claim 18 further comprising the step of discarding the collected thermoplastic material if the period is greater than or equal to the time in which the molten thermoplastic material begins to degrade and reusing the collected thermoplastic material if the period is less than the time in which the molten thermoplastic material begins to degrade.

* * * * *